March 17, 1931.  C. N. FAIRCHILD  1,796,514
BODY LOCKING DEVICE
Filed May 25, 1927
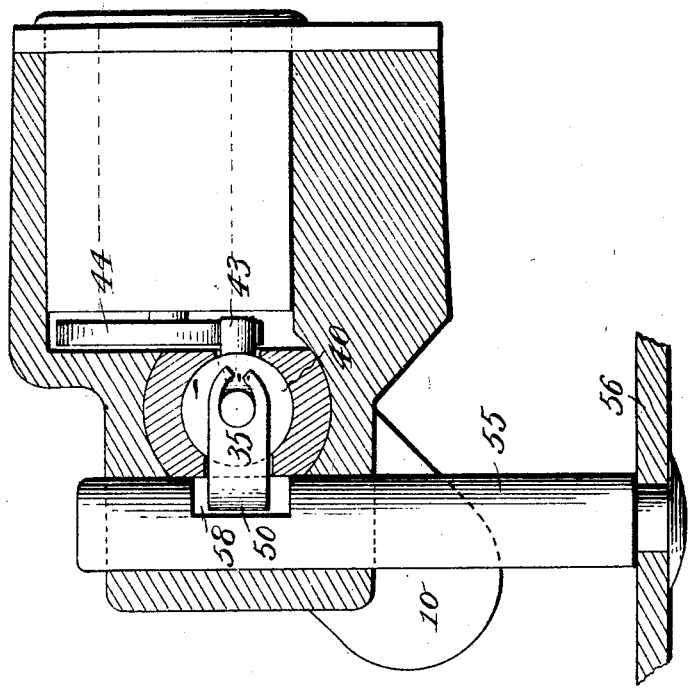
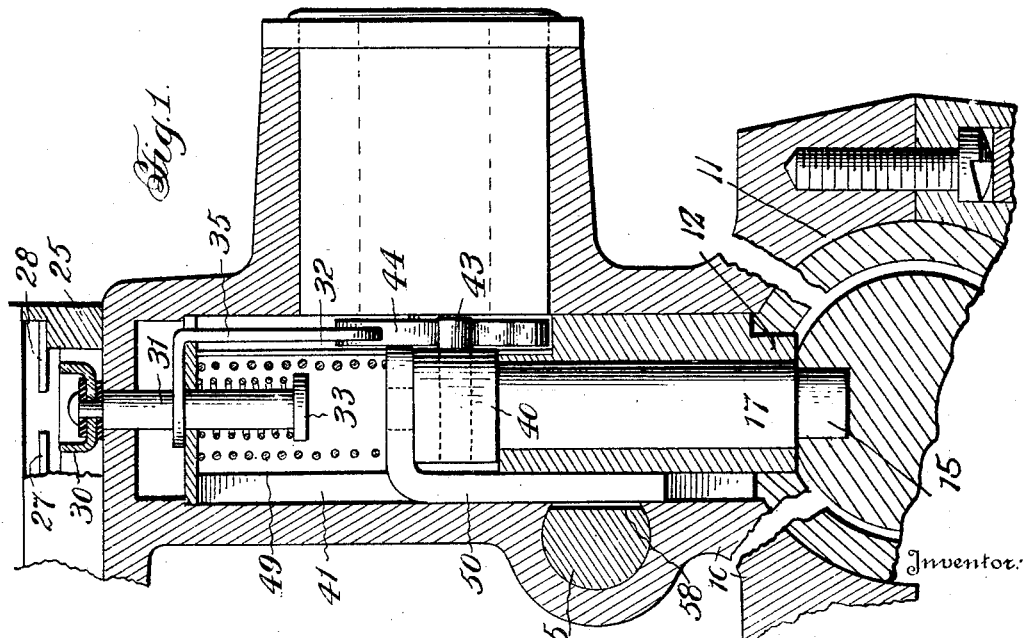

Patented Mar. 17, 1931

1,796,514

UNITED STATES PATENT OFFICE

CHARLES N. FAIRCHILD, OF NEW HAVEN, CONNECTICUT, ASSIGNOR TO FAIRCHILD LOCK CORPORATION, OF NEW YORK, N. Y., A CORPORATION OF DELAWARE

BODY-LOCKING DEVICE

Application filed May 25, 1927. Serial No. 194,194.

This invention relates to coincidental, automobile steering post locks and has for its object the provision of means operated by the locking bolt for locking the steering post locking housing and its associated parts to some fixed member of the automobile body. The invention contemplates the use of a rigid steering post assembly and also the use of a steering post assembly which is of the adjustable type wherein the angle that the steering post makes with the automobile floor or instrument board may be varied to provide suitable amount of space between the wheel and the seat for convenience of the driver. In either case the invention contemplates a tie rod preferably, tho not necessarily, rigid which is positively locked when the steering post is locked to its casing whereby the cutting of the steering post casing beneath the steering post lock will not give freedom of the steering wheel as is the case with most of the prior locks.

In the drawings:—

Figure 1 is a section showing the parts characteristic of the present invention.

Figure 2 is a top plan view.

The lock as a whole is of the same general type as that shown in my Patent No. 1,592,091, July 13, 1926, as far as the relationship between the ignition switch and the locking bolt is concerned save that in my patent the locking bolt directly engages the stem of the ignition switch whereas as shown in the drawings of this application the ignition switch is controlled directly from the locking cylinder cam and there is no contact at any time between the ignition switch stem and the head of the locking bolt altho that construction is intended to be covered by the claims in this case except upon definite statement to the contrary. Many of the elements in this lock bear the same numerals and are identical with parts in my copending application Serial No. 194,195, filed this day.

The lock housing is shown only in part, numeral 10 referring to the major part of the housing which has a semi-cylindrical portion 11 which snugly engages the steering post casing. The boss 12 which may be integral as shown in my patent but is preferably a portion of the member which I prefer to call a plug and which is numbered 41 in the drawings, extends snugly thru the steering post casing or tube and the reduced portion 15 of the locking bolt 17 projects into a hole in the steering post as is quite customary in the art. The switch box is indicated by the numeral 25 and is substantially identical with the structure shown in the patent, the cup 30 bridging the two contacts 27 and 28 to close the ignition circuit when the stem 31 is raised either by contact with the locking bolt head 40 or, as preferred and shown, by means of a slide 35 which is secured to the stem 31 and is in the path of the lifting cam 44 which is fast to the cylinder of the key operated lock as shown in the patent. A spring 32 engages the head 33 of the stem 31 and a disk fitting against a shoulder in the bore in the plug 41 which may be considered an integral part of the housing, this element being provided purely for convenience of manufacture and assembly.

The plug 41 is slabbed off on the side nearest the lock to provide clearance for the lifting cam 44 and is slabbed off on the opposite side to provide clearance for a downwardly projecting member 50 which is secured to the head 40 of the locking bolt 17 and moves with it. This projecting slide is preferably a mere bit of sheet steel bent at right angles as best seen in Figure 1 and having a slot in its horizontal portion to engage a reduced portion of the bolt head 40. Any other means of assembling these two parts may be followed as the slide 50 is naturally moved upward with the bolt 17 when the latter is lifted by the engagement of its transversely extending pin 43 and the lifting cam 44 and is returned or moved downwardly with the locking bolt under the urge of the relatively heavy spring 49 which moves the locking bolt to locking position by appropriate movement of the key in the cylinder lock. While I much prefer that the locking bolt and ignition switch stem 31 shall not move downwardly until the key is withdrawn from the lock, I do not wish the invention considered as limited to this feature and have therefore purposely omitted the parts performing this function, which parts however are shown and illustrated in my patent.

A tie bolt or rod 55 is permanently secured to the instrument board or some other bracket 56 which is a fixed or stationary part of the automobile and this rod or link extends into and preferably entirely thru the housing 10 and in the path of movement of the slide 50. As best shown in Figure 3 the tie rod 55 is slotted as at 58 to receive the slide or check bolt 50. It is not necessary that the check bolt or slide shall fit snugly in the slot 58, the sole purpose of the check bolt being to bar absolutely removal of the tie rod from the housing or, what is the same thing, to prevent movement of the housing away from the bracket 56. This occurs only in locked position of the bolt 17 as the check bolt moves upwardly with the locking bolt and when the steering post is unlocked, that is, when the steering wheel may be turned to steer the automobile the check bolt or slide is above the tie bolt and if, for example, the steering post is adjustable the lock itself offers no obstacle to adjustment of the steering assembly when the steering post is unlocked.

The operation of the device is as follows:—The parts in Figure 1 are shown in locked position. The driver inserts his key in the lock cylinder and turns it so that the cam lifts the pin 43 and with it the locking bolt 17 and the check bolt 50. After a certain amount of angular movement the lifting cam 44 strikes the lower rounded portion of the upper slide 35 and when the bolt is entirely withdrawn or, preferably after a short angular movement beyond that point, the stem 31 has been lifted by the engagement of the slide 35 and lifting cam 44 into running position with the cup bridging the contacts and the ignition circuit then closed and the parts are in running position. Further movement of the key, or, what is the same thing, return movement of the key, lowers the ignition circuit cup breaking the contact and lowers the locking bolt and with it the check bolt 50 which now enters the slot 58 of the tie bolt and locks the tie bolt to the casing.

What I claim is:—

1. In combination, a lock housing, a locking bolt therein, a relatively fixed member, a connector extending from the member to the housing, and means movable with the bolt for locking the connector to the housing when the bolt is moved to locked position.

2. In combination, a lock housing, a sliding bolt in said housing, a relatively fixed member, a connector secured to said member and slidably received in the lock housing, and means movable with said bolt for preventing relative movement between the connector and the housing.

3. In combination, a lock housing, a spring-pressed bolt in said housing, a relatively fixed member, a tie rod fixedly secured to said member and slidable with respect to the lock housing, and means urged by the bolt spring into position to lock the rod to the housing.

4. In an automobile steering post lock, a housing adapted to be secured to the steering post casing, a locking bolt adapted to lock the steering post to the steering post casing, a slotted tie rod relatively fixed with respect to the floor of the automobile and having relative sliding movement with respect to the lock housing, a sliding check bolt within the lock housing adapted to enter the slot of the rod to lock the housing into fixed position with respect to the floor of the automobile, and means for moving the locking bolt to unlocked position and simultaneously moving the sliding check bolt out of the slot in the rod whereby when the locking bolt is in withdrawn position the lock housing and tie rod are freely slidable with respect to each other.

5. In combination, a lock housing, a cylindrical casing secured therein having one side slabbed off, a locking bolt slidably mounted in said casing, a tie rod slidable in said lock housing at an angle to the axes of the bolt and casing and having a transverse slot, a member slidable along the slabbed off end of the casing and adapted to enter the transverse slot of the rod to prevent withdrawal of the tie rod, and key operated means for withdrawing the sliding member from the slot of the rod whereby to free the rod.

6. In a coincidental lock, an ignition switch, a locking bolt, a tie rod check bolt, and key operated means for moving the locking bolt to unlocked position, the check bolt to tie rod freeing position and the ignition switch to circuit closing position.

7. In combination, a lock housing, adapted to receive a member movable with respect to said housing, a locking bolt within said housing serving to hold said member against movement, a relatively fixed member, a link extending from the fixed member to the housing, and a projection carried by the bolt for locking the link to the housing when the bolt is moved to position to lock the movable member.

8. In combination, a lock housing, adapted to receive a member movable with respect to said housing, a locking bolt within said housing serving to hold said member against movement a relatively fixed member, a link extending from the fixed member to the housing, a projection carried by the bolt for locking the link to the housing when the bolt is moved to locked position, key operated means for moving the bolt to unlocked position, and resilient means opposing the action of the key operated means.

9. In a lock, a housing, an ignition switch therein, a tie rod relatively movable with respect to the housing but fixed with respect to a relatively stationary part of the automobile, and means acting to lock the tie bolt to the housing when the ignition circuit is opened.

10. In a locking device, a housing, a locking bolt slidable therein, a tie rod slidable in said housing at an angle to the axis of the bolt, and means constrained to move with said bolt for locking the tie rod to the housing when the bolt is in locking position and to free said tie bolt when the bolt is withdrawn from locking position.

11. In combination, two relatively movable members, a third member, a connector having relative movement with respect to one of said movable members, a manually operated mechanism carried by one of said movable members to lock that member to the third member, and means for locking the connector so as to prevent relative movement of said two movable members upon operation of said mechanism in one direction.

12. The device of claim 11 in which the mechanism opens and closes an electric circuit.

13. The device of claim 11 in which the mechanism includes a spring pressed locking bolt, and the third member is a shaft revolving in one of the movable members.

14. The device of claim 11 in which the mechanism is a coincidental steering post lock secured to one of said movable members.

15. The device of claim 11 in which the connector is a transversely slotted tie rod.

16. In combination, a housing adapted to be permanently secured to a movable part of an automobile and having a bore therein to receive a member secured to a relatively stationary part of the automobile, mechanism within the housing movable into and out of theft preventing position in which an essential device of the automobile is prevented from exercising its function, and additional means obstructing the bore when said mechanism is in theft preventing position.

17. In a lock for application either to a rigid or to an adjustable type steering post assembly to prevent turning of the steering post when the device is locked; a housing to be permanently fastened to the steering post casing, non-extensible means to be permanently secured to a fixed part of the automobile and to be received within a bore in said housing, slidable means within the housing simultaneously preventing removal of the non-extensible means from the housing and preventing rotation of the steering post for steering, and key operated means for moving said slidable means to position to free both the non-extensible means and the steering post.

18. In an automobile lock, a sliding member having two spaced arms, key operated means for moving said member, two shafts, one slidable and the other rotatable, and means cooperating with said member so that in one position of the member one arm shall limit axial movement of the sliding shaft and the other arm shall limit rotation of the other shaft.

19. The device of claim 18 in which the member is a cam operated steering post locking bolt with a parallel check bolt arm, and the slidable shaft is recessed to receive the check bolt arm when the locking bolt arm is in theft preventing position.

20. In a device to prevent unauthorized use of a mechanism, a member movable to disable an essential part of the mechanism, a housing to prevent unauthorized operation of said member, a removable connection between the housing and some body located in fixed relationship to the mechanism, and means moving to operative position to lock the connection to prevent its removal from the housing and the body when the essential part is disabled.

In testimony whereof I affix my signature.

CHARLES N. FAIRCHILD.